US 6,879,996 B1

(12) United States Patent  
Laves (10) Patent No.: US 6,879,996 B1
(45) Date of Patent: Apr. 12, 2005

(54) METHOD AND APPARATUS FOR DISPLAYING PERSONAL DIGITAL ASSISTANT SYNCHRONIZATION DATA USING PRIMARY AND SUBORDINATE DATA FIELDS

(76) Inventor: Edward W. Laves, 622 N. Elmwood Ave., Oak Park, IL (US) 60302-1726

( * ) Notice: Subject to any disclaimer, the term of this patent is extended or adjusted under 35 U.S.C. 154(b) by 727 days.

(21) Appl. No.: 09/660,613

(22) Filed: Sep. 13, 2000

(51) Int. Cl.$^7$ .............................................. G06F 15/16
(52) U.S. Cl. ........................ 709/206; 709/228; 709/248
(58) Field of Search ................................ 709/206–207; 379/93.01–93.37

(56) References Cited

U.S. PATENT DOCUMENTS

| | | | |
|---|---|---|---|
| 5,497,339 A | 3/1996 | Bernard | 364/705.05 |
| 5,515,305 A | 5/1996 | Register et al. | 364/709.15 |
| 5,519,606 A | 5/1996 | Frid-Nielsen et al. | 364/401 |
| 5,548,506 A | 8/1996 | Srinivasan | 364/401 |
| 5,596,748 A | 1/1997 | Kleewein et al. | 395/610 |
| 5,625,673 A | 4/1997 | Grewe et al. | 379/61 |
| 5,664,207 A | 9/1997 | Crumpler et al. | 395/766 |
| 5,666,553 A | 9/1997 | Crozier | 395/803 |
| 5,680,609 A | 10/1997 | Reinhardt | 395/610 |
| 5,684,984 A | 11/1997 | Jones et al. | 395/610 |
| 5,684,990 A | 11/1997 | Boothby | 695/619 |
| 5,689,706 A | 11/1997 | Rao et al. | 395/617 |
| 5,694,596 A | 12/1997 | Campbell | 395/610 |
| 5,701,423 A | 12/1997 | Crozier | 395/335 |
| 5,701,461 A | 12/1997 | Dalal et al. | 395/604 |
| 5,706,431 A | 1/1998 | Otto | 395/200.03 |
| 5,710,922 A | 1/1998 | Alley et al. | 395/617 |
| 5,727,202 A | 3/1998 | Kucala | 395/610 |
| 5,729,735 A | 3/1998 | Meyering | 395/610 |
| 5,734,891 A | 3/1998 | Saigh | 395/610 |
| 5,737,601 A | 4/1998 | Jain et al. | 395/617 |
| 5,740,405 A | 4/1998 | DeGraaf | 395/500 |

(Continued)

OTHER PUBLICATIONS

*YAHOO! Calendar*, (visited Mar. 13, 2000), <http://calendar.yahoo.com/yc/us/?v=140&pi=100>.

"Rational ClearCase Featuring Unified Change Management", Simplifying the Process of Change, Rational Software Corporation, 2000.

*iMobile Data Synchronization for Palm Computing*, (visited Jan. 18, 2000), <http://www.synchrologic.com/images/whitepapers/imobile_palm_whitepaper.html>.

*Starfish*, (visited Feb. 7, 2000), <http://www.starfishsoftware.com/products/truetech/truetech.html>.

*About Puma Technology, Inc.*, (visited Jan. 18, 2000), <http://www.pumatech.com/profile-back.html>.

"Keep Your Mobile Workforce Current—Anytime, Anywhere", (visited Jan. 18, 2000), <http://www.pumatech.com/enterprise/product-ia-exchange.html>.

"Effective Mobile Computing Requires Exceptional Mobile Technology", iMobile from Synchrologic™.

"Synchrologic iMobile Data Synchronization", (visited Jan. 18, 2000) <http://www.synchrologic.com/images/whitepapers/imobile_white_paper.html>.

Primary Examiner—Jack B. Harvey
Assistant Examiner—Thomas Duong
(74) Attorney, Agent, or Firm—Marshall, Gerstein & Borun LLP (57) ABSTRACT

The method and apparatus described herein provides a system for displaying personal information management (PIM) data on a personal digital assistant (PDA). The PIM data may be shared by multiple users and modified at the PDA displaying the data, at another PDA, and/or at a personal computer. When the same data field is changed by more than one device, the system displays the most recent version of the data as the primary data field with a symbol to indicate a subordinate data field is available in memory. By selecting the symbol, the user may swap the primary and subordinate data fields.

22 Claims, 6 Drawing Sheets

U.S. PATENT DOCUMENTS

| | | | | |
|---|---|---|---|---|
| 5,742,820 | A | 4/1998 | Perlman et al. | 395/617 |
| 5,742,905 | A | 4/1998 | Pepe et al. | 455/461 |
| 5,745,282 | A | 4/1998 | Negi | 359/322 |
| 5,764,972 | A | 6/1998 | Crouse et al. | 395/601 |
| 5,765,038 | A | 6/1998 | Flannery et al. | 395/610 |
| 5,774,673 | A | 6/1998 | Beuk et al. | 395/200.66 |
| 5,774,867 | A | 6/1998 | Fitzpatrick et al. | 705/8 |
| RE35,861 | E | 7/1998 | Queen | 395/772 |
| 5,778,068 | A | 7/1998 | Johnson et al. | 380/25 |
| 5,778,346 | A | 7/1998 | Frid-Nielsen et al. | 705/9 |
| 5,797,089 | A | 8/1998 | Nguyen | 455/403 |
| 5,832,473 | A | 11/1998 | Lee et al. | 707/2 |
| 5,845,257 | A | 12/1998 | Fu et al. | 705/8 |
| 5,845,282 | A | 12/1998 | Alley et al. | 707/10 |
| 5,848,395 | A | 12/1998 | Edgar et al. | 705/9 |
| 5,852,807 | A | 12/1998 | Skarbo et al. | 705/7 |
| 5,855,006 | A | 12/1998 | Huemoeller et al. | 705/9 |
| 5,867,822 | A | 2/1999 | Sankar | 705/8 |
| 5,870,584 | A | 2/1999 | Bennett | 395/500 |
| 5,894,595 | A | 4/1999 | Foladare et al. | 455/414 |
| 5,899,979 | A | 5/1999 | Miller et al. | 705/9 |
| 5,941,648 | A | 8/1999 | Robinson et al. | 400/82 |
| 5,943,676 | A | 8/1999 | Boothby | 707/201 |
| 5,960,406 | A | 9/1999 | Rasansky et al. | 705/9 |
| 5,963,913 | A | 10/1999 | Henneuse et al. | 705/9 |
| 5,978,577 | A | 11/1999 | Rierden et al. | 395/610 |
| 5,995,985 | A | 11/1999 | Cai | 707/507 |
| 6,006,274 | A | 12/1999 | Hawkins et al. | 709/248 |
| 6,011,537 | A | 1/2000 | Slotznick | 345/115 |
| 6,012,063 | A | 1/2000 | Bodnar | 707/101 |
| 6,016,478 | A | 1/2000 | Zhang et al. | 705/9 |
| 6,016,553 | A * | 1/2000 | Schneider et al. | 714/21 |
| 6,052,735 | A * | 4/2000 | Ulrich et al. | 709/236 |
| 6,125,369 | A * | 9/2000 | Wu et al. | 707/201 |
| 6,226,650 | B1 * | 5/2001 | Mahajan et al. | 707/201 |
| 6,272,545 | B1 * | 8/2001 | Flanagin et al. | 709/228 |
| 6,282,709 | B1 * | 8/2001 | Reha et al. | 717/175 |
| 6,324,544 | B1 * | 11/2001 | Alam et al. | 707/201 |
| 6,370,566 | B2 * | 4/2002 | Discolo et al. | 709/206 |
| 6,470,329 | B1 * | 10/2002 | Livschitz | 707/1 |
| 6,505,233 | B1 * | 1/2003 | Hanson et al. | 709/204 |
| 6,560,620 | B1 * | 5/2003 | Ching | 715/511 |

* cited by examiner

METHOD AND APPARATUS FOR DISPLAYING PERSONAL DIGITAL ASSISTANT SYNCHRONIZATION DATA USING PRIMARY AND SUBORDINATE DATA FIELDS

TECHNICAL FIELD OF THE INVENTION

The present invention relates in general to a method and apparatus for displaying data on a personal digital assistant and in particular to displaying data entered at multiple devices by using primary and subordinate data fields.

BACKGROUND

As more and more people use electronic devices to manage data such as contacts, appointments, notes, etc., the opportunity to access that data from multiple devices increases. For example, a single user may want to access his personal calendar from his/her home computer, office computer, and personal digital assistant (PDA). In addition, more than one user may wish to share data such as a list of common contacts with names, addresses, telephone numbers, etc. If the data is modified on one device, but not the others, a synchronization session is required to bring all the devices up to date.

Typically, during a synchronization session, the older versions of data are replaced by more recent versions of data based on a time stamp associated with the data field. However, this simple replacement approach presents certain drawbacks. First, if a particular field of data is modified by more than one user before a synchronization session occurs, neither version may be the "correct" version. For example, if the field is titled "client notes" and is shared by more than one employee who services that client, a first employee may modify the notes to reflect his experience that day while another employee also modifies the notes to reflect his experiences that day. Neither one of the new versions in this example has both sets of notes because there was no synchronization session in-between the two data entries. Present systems select the version that was made later in the day to the detriment of the other version. This method is arbitrary and loses valuable data.

Another typical method used in synchronization sessions is to request the user to choose between conflicting changes to a synchronized record. This approach also presents certain drawbacks. First, the time required for a user to make choices can be very time consuming and burdensome. Second, different users in a synchronized work group may make conflicting decisions. As a result, another synchronization session is required.

Yet, another problem that both the simple replacement approach and the user query approach present is that if incorrect data is entered on top of correct data by one user, all copies of the correct data are lost after the synchronization session. For example, if a user enters a contact's home phone number in a work phone number field and then updates all the other devices via a synchronization session, that contact's work phone number is lost.

SUMMARY OF THE INVENTION

In one aspect, the invention is directed to a method for displaying first personal information management data (first PIM data) entered on a personal digital assistant (PDA) and second personal information management data (second PIM data) entered on a computing device. The first PIM data is associated with a first field name, and the second PIM data is associated with a second field name. The PDA includes a display device. The method comprises the steps of retrieving a first time stamp generated when the first PIM data was entered, and retrieving a second time stamp generated when the second PIM data was entered. The method compares the first field name and the second field name. The method also compares the first time stamp and the second time stamp. The first PIM data is then selected as a primary data field and the second PIM data is selected as a subordinate data field if the first field name matches the second field name and the first time stamp is later then the second time stamp. Subsequently, the primary data field is displayed on the display of the PDA along with a symbol to indicate that the subordinate data field is available.

In one embodiment, the method further comprises the step of detecting a user input associated with the symbol. In such an instance, the method preferably removes the primary data field from the display of the PDA in response to the detection of the user input associated with the symbol and displays the subordinate data field. In some embodiments, the method notifies a user that a subordinate data field was created during a synchronization session. In another embodiment, there are multiple subordinate data fields associated with a primary data field which the user can page through in order to select the desired data field. In a preferred embodiment, the method further comprises the step of transmitting a synchronization request to a plurality of PDAs and/or a plurality of e-mail addresses listed in a field specific work group associated with the first field name. In one embodiment, the method further comprises the step of archiving data including the primary data field and the subordinate data field at a host during a synchronization session.

In another aspect, the invention is directed to a personal digital assistant which comprises a display device, a memory device, and a processor. The memory device stores a software program, a primary data field, and one or more subordinate data fields. The processor is operatively coupled to the display device and the memory device and executes the software program stored in the memory device. During execution of the software program, the processor retrieves the primary data field and the subordinate data field(s) from the memory device and causes the display device to toggle between the primary data field and the subordinate data field (or page through multiple subordinate data fields) in response to a user input.

In yet another aspect, the invention is directed to a computer readable medium storing a software program for displaying first personal information management data (first PIM data) and second persona) information management data (second PIM data). Preferably, the first PIM data is associated with a first field name and the second PIM data is associated with a second field name. The software program is adapted for execution by a processor associated with a PDA. The PDA includes a display device. The software program comprises a first program portion which when executed by the processor causes the processor to retrieve (i) a first time stamp generated when the first personal information management data was entered, and (ii) a second time stamp generated when the second PIM data was entered. The software program also comprises a second program portion which when executed by the processor causes the processor to compare the first field name and the second field name. The software program further comprises a third program portion which when executed by the processor causes the processor to compare the first time stamp and the second time stamp. Still further, the software program comprises a fourth program portion which when executed by the processor causes the processor to select the first PIM data as a primary data field and the second PIM data as a subordinate data field if the first field name matches the second field name and the first time stamp is later then the second time stamp. Yet further, the software program comprises a fifth program portion which when executed by the processor causes the processor to display the primary data field on the display of the PDA. In addition, the software program comprises a sixth program portion which when executed by the processor causes the processor to display a symbol on the display of the PDA to indicate that the subordinate data field is available.

In one embodiment, the software program further comprises a seventh program portion, an eighth program portion, and a ninth program portion. The seventh program portion, when executed by the processor, causes the processor to detect a user input associated with the symbol. The eighth program portion, when executed by the processor, causes the processor to remove the primary data field from the display of the PDA in response to the detection of the user input associated with the symbol. The ninth program portion, when executed by the processor, causes the processor to display the subordinate data field on the display of the PDA in response to the detection of the user input associated with the symbol.

BRIEF DESCRIPTION OF THE DRAWINGS

These and other features and advantages of the present invention will be apparent to those of ordinary skill in the art in view of the detailed description of the preferred embodiment which is made with reference to the drawings, a brief description of which is provided below.

DETAILED DESCRIPTION OF THE PREFERRED EMBODIMENTS

In general, the system described herein displays personal information management (PIM) data on a personal digital assistant (PDA). The PIM data may be viewed and/or modified by a plurality of different devices. For example, a user may maintain his/her contacts database on both a PDA and a PC. Further, more than one user in the same company or work group may share a certain portion of their contacts. When the same data field is changed by more than one device, the system displays the most recent version of the data as the primary data field with a symbol to indicate a subordinate data field is available. By selecting the symbol, the user may swap the primary and subordinate data fields.

Figure 1:
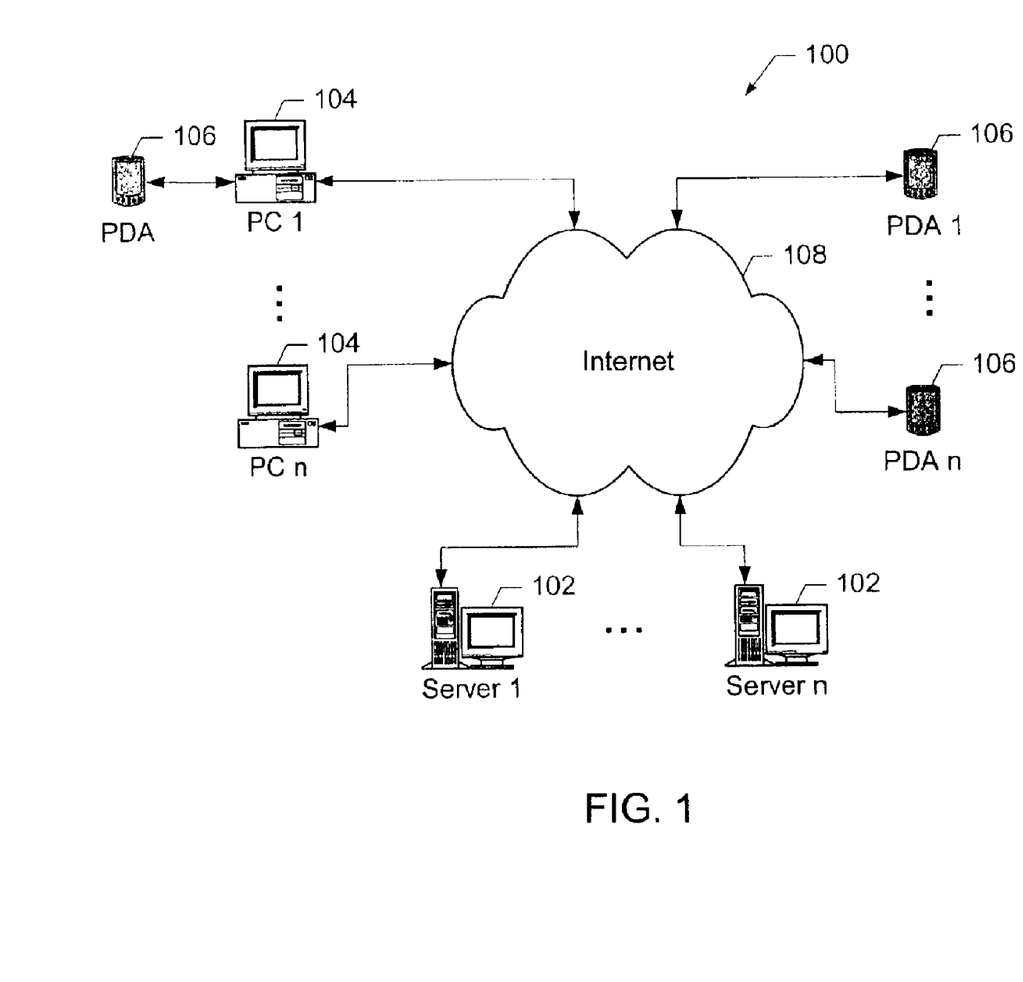
FIG. 1 is a high level block diagram of a communications system.

A high level block diagram of a communications system 100 is illustrated in FIG. 1. The system 100 includes one or more servers 102, one or more personal computers (PCs) 104, and one or more personal digital assistants (PDAs) 106. Each of these components may communicate with each other via a connection to the Internet or some other wide area network 108. Typically, servers 102 store a plurality of files, programs, and/or web pages for use by the PCs 104 and PDAs 106. One server 102 may handle requests from a large number of clients (i.e., PCs 104 and/or PDAs 106). Accordingly, each server 102 is typically a high end computer with a large storage capacity, one or more fast microprocessors, and one or more high speed network connections. Conversely, relative to a typical server 102, each PC 104 typically includes less storage capacity, a single medium to high speed microprocessor, and a single medium speed network connection.

A typical PDA 106 includes even less storage capacity, processing power, and bandwidth capability than a typical PC 104. A PDA 106 may be connected to the network 108 directly via a modem and/or other network interface, or a PDA 106 may be connected to the network 108 indirectly via a PC 104 which is in turn connected to the network 108 via a modem and/or other network interface. Often, A PDA 106 is disconnected from the network 108.

A particular user's appointments, calendars, schedules, notes, contacts, and other personal information management (PIM) data may be modified at that person's PDA 106 and/or PC 104 while the two are disconnected. In such an instance, a PC based synchronization session is commonly used to bring both devices up to date. Further, one user's PIM data may be modified at another user's PDA 106 and/or another user's PC 104. In this case, a server based synchronization session may be employed to bring all the devices up to date.

Figure 2:
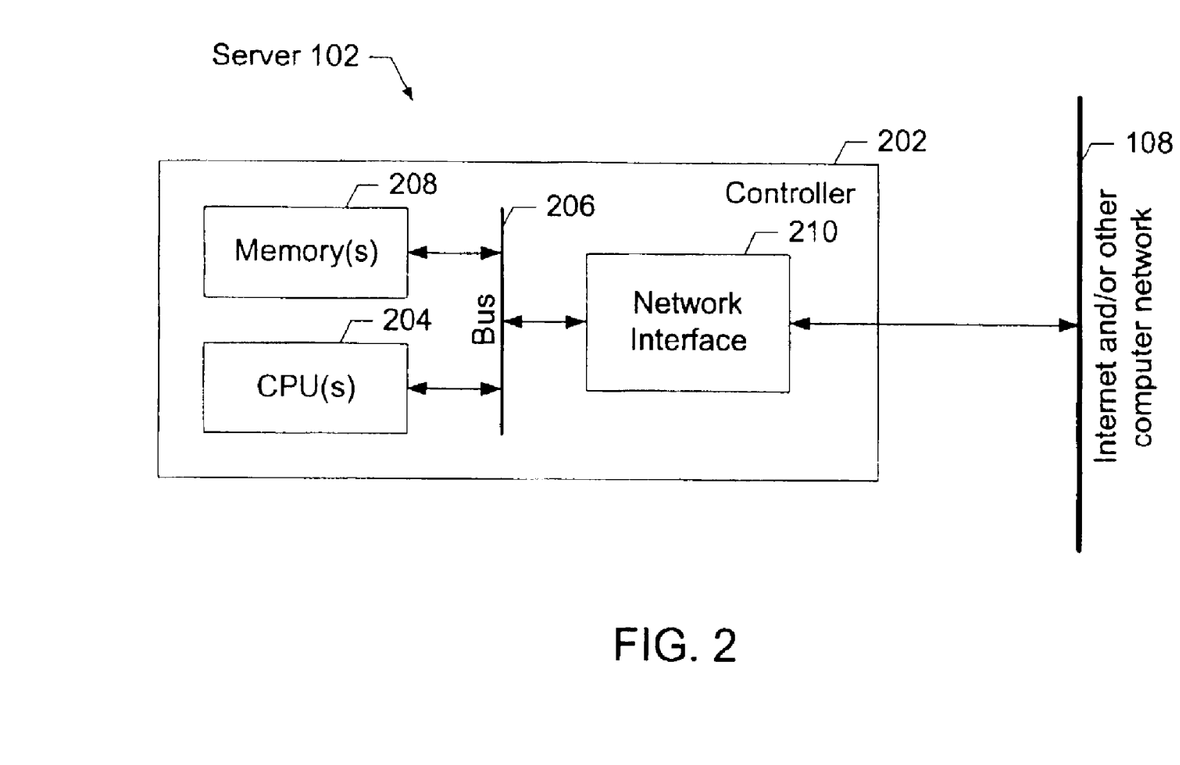
FIG. 2 is a more detailed block diagram of one of the servers illustrated in FIG. 1.

A more detailed block diagram of a server 102 is illustrated in FIG. 2. A controller 202 in the server 102 preferably includes a central processing unit 204 electrically coupled by an address/data bus 206 to a memory device 208 and a network interface circuit 210. The CPU 204 may be any type of well known CPU, such as an Intel Pentium™ processor. The memory device 208 preferably includes volatile memory, such as a random-access memory (RAM), and non-volatile memory, such as a read only memory (ROM) and/or a magnetic disk. The memory device 208 stores a software program that implements all or part of the method described below. This program is executed by the CPU 204, as is well known. However, some of the steps described in the method below may be performed manually or without the use of the server 102. The memory device 208 also stores PIM data, files, programs, web pages, etc. for retrieval and update by the PCs 104 and/or PDAs 106.

The server 102 may exchange data with other computing devices via a connection to the network 108. The network interface circuit 210 may be implemented using any data transceiver, such as an Ethernet transceiver. The network 108 may be any type of network, such as a local area network (LAN) and/or the Internet.

Figure 3:
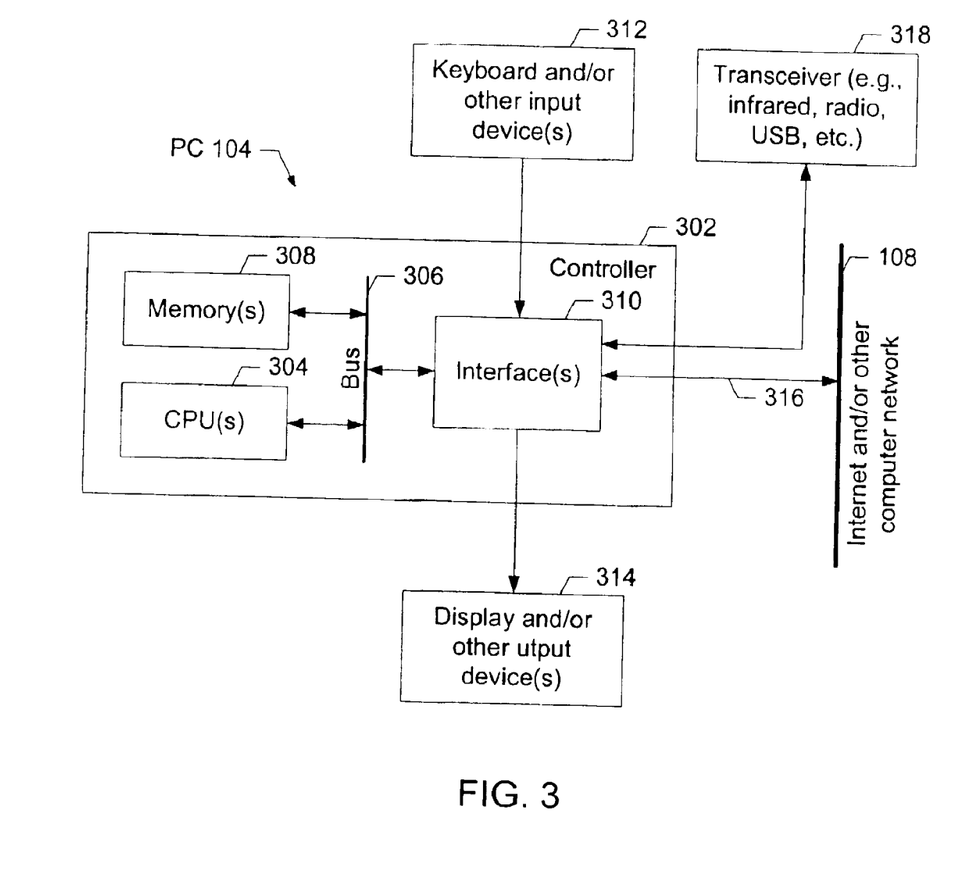
FIG. 3 is a more detailed block diagram of one of the personal computers illustrated in FIG. 1.

A more detailed block diagram of a PC 104 is illustrated in FIG. 3. Like the server 102, the PC 104 includes a controller 302 which preferably includes a central processing unit 304 electrically coupled by an address/data bus 306 to a memory device 308 and an interface circuit 310. Again, the CPU 304 may be any type of well known CPU, such as an Intel Pentium™ processor, and the memory device 308 preferably includes volatile memory and non-volatile memory. However, as discussed above, the CPU 304 and/or memory device 308 associated with a typical PC 104 may not be as powerful as the CPU 204 and/or memory 208 associated with a typical server 102. Like the server 102, the memory device 308 associated with the PC 104 stores a software program that implements all or part of the method described below. This program is executed by the CPU 304, as is well known. However, some of the steps described in the method below may be performed manually or without the use of the PC 104. The memory device 308 also stores PIM data, files, programs, web pages, etc. retrieved from a server 102 and/or transmitted by a PDA 106.

The interface circuit 310 may be implemented using any type of well known interface standard, such as an Ethernet interface and/or a Universal Serial Bus (USB) interface. One or more input devices 312 may be connected to the interface circuit 310 for entering data and commands into the controller 302. For example, the input device 312 may be a keyboard, mouse, touch screen, track pad, track ball, isopoint, and/or a voice recognition system. One or more output devices 314 may also be connected to the controller 302 via the interface circuit 310. Examples of output devices 314 include cathode ray tubes (CRTs), liquid crystal displays (LCDs), speakers, and/or printers. The output device 312 generates visual displays and/or audio sounds of data generated during operation of the PC 104. The visual displays may include prompts for human operator input, run time statistics, calculated values, detected data, etc.

The PC 104 may also exchange data with other computing devices via a connection 316 to the network 108 and/or a direct connection data transceiver 318. The network connection 316 may be any type of network connection, such as an Ethernet connection, digital subscriber line (DSL), telephone line, coaxial cable, etc. The data transceiver 318 may be any type of data transceiver, such as an infrared transceiver, a radio transceiver, a Universal Serial Bus transceiver (USB), etc.

Figure 4:
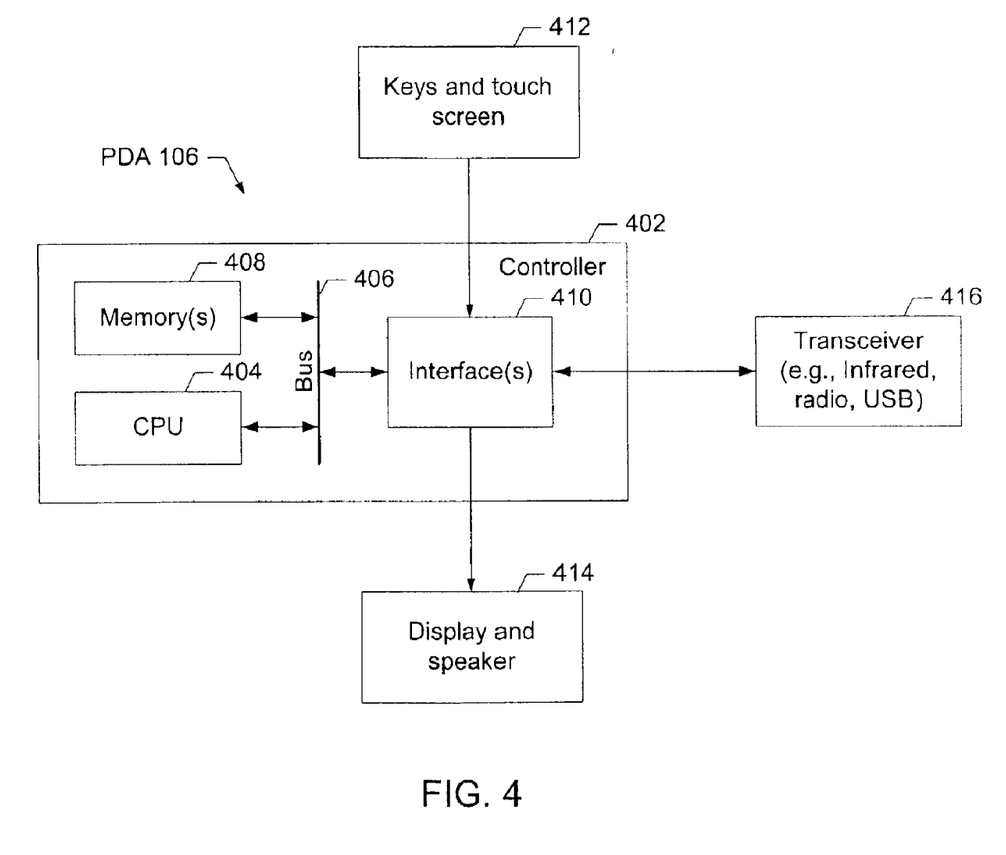
FIG. 4 is a more detailed block diagram of one of the personal digital assistants illustrated in FIG. 1.

A more detailed block diagram of a PDA 106 is illustrated in FIG. 4. The PDA 106 also includes a controller 402 which preferably includes a central processing unit 404 electrically coupled by an address/data bus 406 to a memory device 408 and an interface circuit 410. Although, the PDA CPU 404 may be any type of well known CPU, typically the PDA CPU 404 is less powerful than the PC CPU 304 and the server CPU 204. Similarly, the PDA memory device 408, which preferably includes volatile and non-volatile memory, is not as large as the PC memory device 308 and the server device 208. Like the server 102 and PC 104, the PDA memory device 408 stores a software program that implements all or part of the method described below. This program is executed by the CPU 404, as is well known. However, some of the steps described in the method below may be performed manually or without the use of the PDA 106. The memory device 408 also stores PIM data, files, programs, web pages, etc. retrieved from a server 102 and/or a PC 104.

The interface circuit 410 may be implemented using any data transceiver, such as an infrared transceiver, a radio transceiver, an Ethernet transceiver, and/or a Universal Serial Bus (USB) transceiver. One or more input devices 412 are connected to the interface circuit 410 for entering data and commands into the controller 402. Typically, PDA input devices 412 include a small number of keys and a touch screen.

One or more output devices 414 are connected to the PDA controller 402 via the interface circuit 410. Typically, a PDA 106 includes a liquid crystal display and a speaker. The output device 414 generates visual displays and/or audio of data generated during operation of the PDA 106. The visual displays may include prompts for human operator input, run time statistics, calculated values, detected data, etc. The PDA 106 may also exchange data with other computing devices via a connection to the network 108. The connection may be any type of network connection, such as an Ethernet connection, digital subscriber line (DSL), telephone line, coaxial cable, etc.

Figure 5:
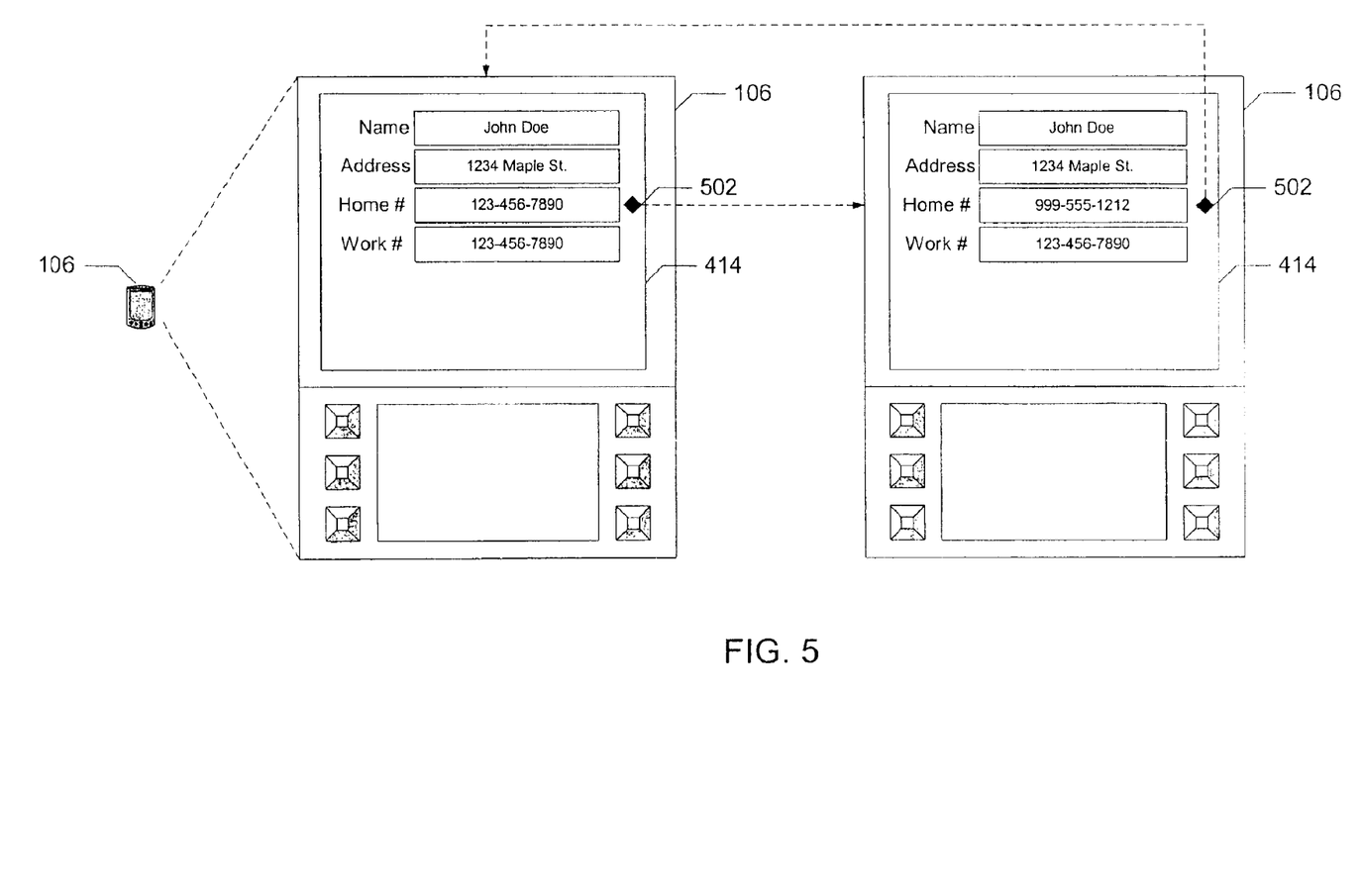
FIG. 5 is a more detailed block diagram of the personal digital assistant display of FIG. 4 displaying exemplary personal information management data.

The PDA display 414 often generates text and graphics indicative of the personal information management (PIM) data. A more detailed block diagram of the PDA display 414 displaying exemplary PIM data is illustrated in FIG. 5. In this example, the display shows a "contacts" data record which includes four data fields. Each data field may include a data field identifier (e.g., "Name") and a data field value (e.g., "John Doe"). The user may modify a particular data field value from the PC 104 and/or the PDA 106. In such an instance, the PIM data may not be up to date on the other device. For example, if the phone number associated with a particular person is changed at the PC 104, but not at the PDA 106, the PDA 106 will not have the new phone number. Accordingly, a synchronization session is typically used to bring the two devices up to date.

During a synchronization session, a new value is typically retained in favor of an old value based on a time stamp. However this may cause valuable data to be lost. For example, if a contact's work phone number is inadvertently entered as a replacement to the contact's home phone number, the home phone number information is lost from memory. Accordingly, in the event that a particular data field is associated with more than one data field value, both values are retained, the newest value is displayed as the primary data field, and a graphical symbol 502 is displayed near the primary data field to indicate the status of the data field to the user.

The graphical symbol 502 may be selected by the user via a PDA input device 412. For example, the user may press the symbol using a stylus and a touch screen. If the graphical symbol 502 is selected, the PDA 106 preferably switches to displaying the subordinate data field. For example, the old (correct) phone number in the example above may be retrieved. Preferably, when the PDA 106 switches to displaying the subordinate data field, the primary data field becomes the subordinate data field and vice versa. This allows the two (or more) values to be repeatedly cycled.

Figure 6:
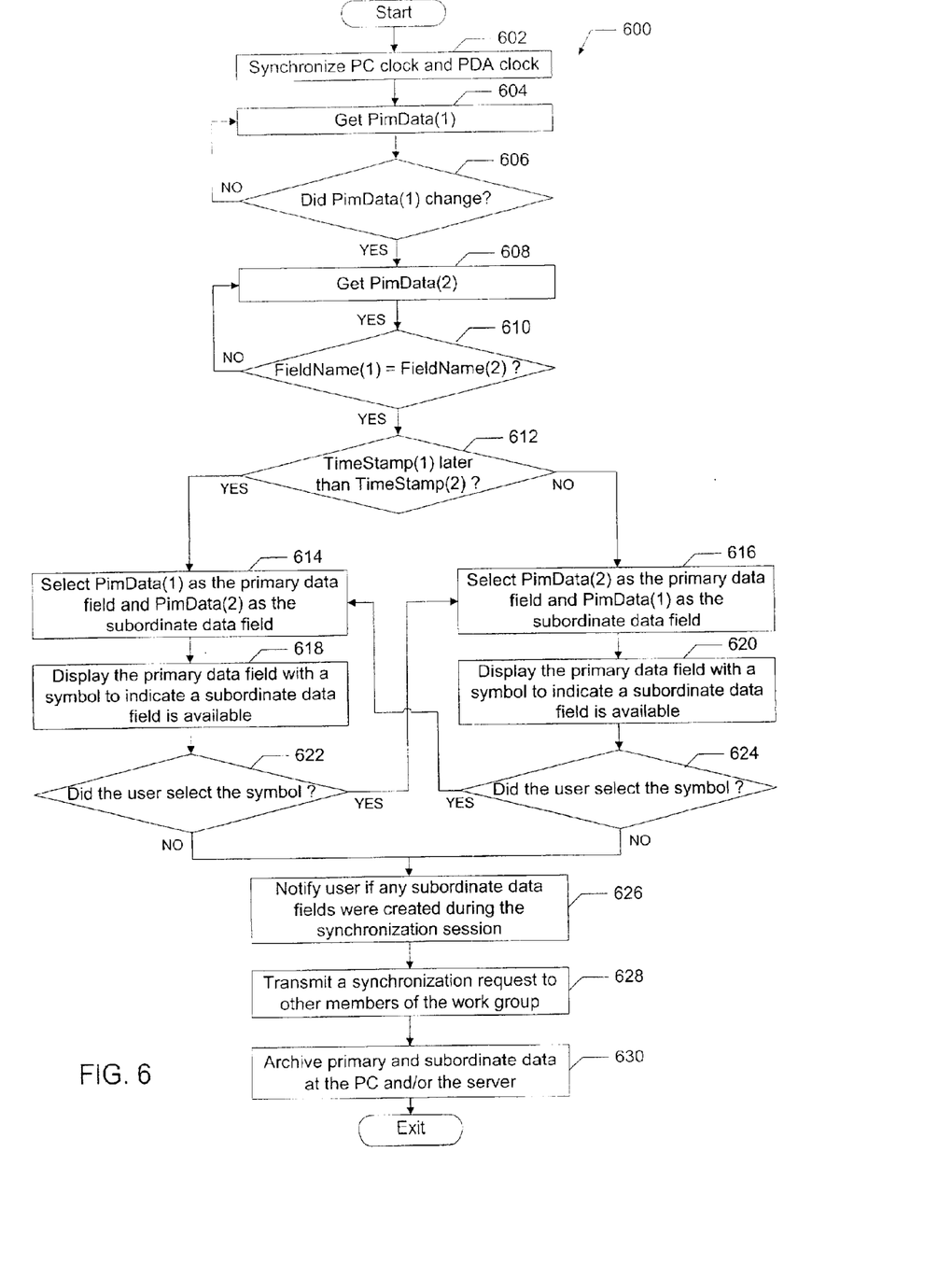
FIG. 6 is a flowchart of a process for displaying personal information management data entered on a personal digital assistant and/or a computing device using primary and subordinate data fields.

A flowchart of a process 600 for displaying personal information management (PIM) data entered on a personal digital assistant (PDA) and/or a computing device using primary and subordinate data fields is illustrated in FIG. 6. Preferably, the process 600 is executed by the PDA CPU 404, the PC CPU 304, and/or the server CPU 204 as is well known. However, one or more of the steps described below may be performed without the use of a CPU. Generally, the process 600 determines if a data field value has been changed. If a value has been changed, the process 600 displays the primary data field and a symbol indicative of a stored (but not displayed) subordinate data field. When the process 600 detects a user selection associated with the symbol, the process 600 swaps the primary and subordinate data fields.

The process 600 begins by synchronizing a clock associated with the PC 104 and a clock associated with the PDA 106 (step 602). In this manner, subsequent synchronization sessions may be more accurate. Subsequently, the process 600 retrieves PIM data from the PC 104 or other device (step 604) and determines if the data has been changed since the last synchronization session (step 606). The process 600 may employ a changed record flag and/or compare a time stamp associated with the data to a time stamp associated with the last synchronization session to determine if the data has been changed as is well known. If the data has not been changed since the last synchronization session, the process 600 loops back to step 604 to retrieve more data.

However, if the retrieved PIM data has been changed since the last synchronization session, the process 600 retrieves PIM data from the PDA 106 or other device (step 608). Subsequently, the process 600 compares an identifier associated with the first data to an identifier associated with the second data (step 610). If the field identifiers do not match, the process loops back to step 608 to retrieve more PIM data from the PDA 106 or other device. In other words, the process 600 searches for a field of data from the second device (e.g., the PDA 106) which corresponds to the changed data from the first device (e.g., the PC 104). Alternatively, the process could index into (as opposed to brute force searching) the second set of data (e.g., the PDA data) for a field with the same name or index number as the changed data from the first device (e.g., the PC 104).

Once a field of data that resides on both devices and has been changed on one or both devices is found, the process 600 compares the time stamps associated with the data to determine which data entry is newer (step 612). If the first time stamp is later than the second time stamp, the first PIM data is selected as the primary PIM data and the second PIM data is selected as the subordinate PIM data (step 614). Conversely, if the first time stamp is not later than the second time stamp, the second PIM data is selected as the primary PIM data and the first PIM data is selected as the subordinate PIM data (step 616). In either case, the process 600 displays the primary data field with a graphical symbol 502 to indicate that a subordinate data field is available (step 618 or step 620). If the user selects the graphical symbol 502 (step 622 or step 624), the primary and subordinate data fields are swapped (step 616 or step 614 respectively). Of course, a person of ordinary skill in the art will readily appreciate that a plurality of subordinate data fields may be displayed in response to the selection of the graphical symbol 502 or any other user command.

Regardless of the data selected as the primary data field and regardless of whether the user selects the graphical symbol to swap the primary and subordinate data fields, the user is preferably notified if any subordinate data fields are created during a synchronization session (step 626). Often, thousands of data fields are compared with only a few changes. In such an instance, the user may be given the option of reviewing data fields where subordinate data fields exist. Alternatively, the user may be given the option to only review data fields where both the PDA version and the PC version changed since the last synchronization session.

In addition to notifying the user, the process 600 may transmit a synchronization request to a plurality of other users listed in a common work group (step 628). This transmission may be carried out using any communication protocol such as an electronic mail message and/or a transport control protocol/Internet protocol (TCP/IP) message. In response, certain users in the work group may initiate a server synchronization session via, for example, the Internet. In order to facilitate these server synchronization sessions, the process archives the primary and subordinate data fields created during each PC synchronization session at the PC 104 and/or one or more servers 102 (step 630).

In summary, persons of ordinary skill in the art will readily appreciate that a method and apparatus for displaying personal information management data on a personal digital assistant using primary and subordinate data fields has been provided. Systems implementing the teachings of the present invention can enjoy increased flexibility in the display of data fields and less lost data.

The foregoing description has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

What is claimed is:

1. A method for displaying first personal information management data (first PIM data) entered on a personal digital assistant (PDA) and second personal information management data (second PIM data) entered on a computing device, the first PIM data being associated with a first field identifier, the second PIM data being associated with a second field identifier, the PDA including a display device, the method comprising the steps of:

retrieving a first time stamp generated when the first PIM data was entered;

retrieving a second time stamp generated when the second PIM data was entered;

comparing the first field identifier and the second field identifier;

comparing the first time stamp and the second time stamp;

selecting the first PIM data as a primary data field and the second PIM data as a subordinate data field if the first field identifier matches the second field identifier and the first time stamp is later than the second time stamp;

displaying the primary data field on the display of the PDA; and displaying a symbol on the display of the PDA to indicate that the subordinate data field is available.

2. A method as defined in claim 1, further comprising the steps of:

detecting a user input associated with the symbol;

removing the primary data field from the display of the PDA in response to the detection of the user input associated with the symbol; and displaying the subordinate data field on the display of the PDA in response to the detection of the user input associated with the symbol.

3. A method as defined in claim 1, further comprising the step swapping the primary data field and the subordinate data field.

4. A method as defined in claim 1, further comprising the step of notifying a user during a PDA synchronization session that a subordinate data field exists.

5. A method as defined in claim 1, further comprising the steps of paging through a plurality of subordinate data fields in response to a user command.

6. A method as defined in claim 1, further comprising the step of reading a changed record flag to determine if the first PIM data changed.

7. A method as defined in claim 1, further comprising the step of synchronizing a clock associated with the PDA and a clock associated with the computing device during a PDA synchronization session.

8. A method as defined in claim 1, further comprising the step of transmitting a synchronization request to a plurality of PDAs listed in a field specific work group, the field specific work group being associated with the first field identifier.

9. A method as defined in claim 8, further comprising the step of receiving a work group selection from a user.

10. A method as defined in claim 8,
wherein the step of transmitting a synchronization request to a plurality of PDAs listed in a field specific work group comprises the step of transmitting a synchronization request via an e-mail message, and:
the method further comprises the step of receiving a synchronization initiation message via a TCP/IP protocol from one of the plurality of PDAs listed in the field specific work group.

11. A method as defined in claim 1, further comprising the step of archiving data including the primary data field and the subordinate data field at a host during a PDA synchronization session.

12. A method as defined in claim 11, wherein the host comprises the computing device.

13. A method as defined in claim 11, further comprising the steps of browsing the archived data using the PDA and retrieving selected archived data for storage in the PDA.

14. A method as defined in claim 11, further comprising the step of automatically deleting a portion of the archived data after an aging period.

15. A method as defined in claim 14, wherein the aging period comprises a user settable aging period.

16. A personal digital assistant comprising:
a display device;
a memory device storing a software program, a primary data field, and a subordinate data field; and
a processor operatively coupled to the display device and the memory device, the processor executing the software program stored in the memory device; the processor retrieving the primary data field and the subordinate data field from the memory device, the primary data field being associated with a first field identifier and a first time stamp, the subordinate data field being associated with a second field identifier and a second time stamp, the first field identifier being equal to the second field, the first time stamp being more recent than the second time stamp, the processor causing the display device to hide the primary data field and display the subordinate data field in response to a user input.

17. A personal digital assistant as defined in claim 16, wherein the memory device comprises a non-volatile component storing the software program and a volatile component storing the primary data field and the subordinate data field.

18. A personal digital assistant as defined in claim 16, wherein:
the processor causes the display device to display the primary data field and a symbol indicative of the subordinate data field; and
the user input comprises a selection of the symbol.

19. A personal digital assistant as defined in claim 16, wherein:
the processor receives a notification that a subordinate data field exists; and
the processor causes the display device to display the notification.

20. A personal digital assistant as defined in claim 16, wherein the processor receives a clock synchronization signal from a computing device during a synchronization session between the personal digital assistant and the computing device.

21. A computer readable medium storing a software program for displaying first personal information management data (first PIM data) entered on a personal digital assistant (PDA) and second personal information management data (second PIM data) entered on a computing device, the first PIM data being associated with a first field identifier, the second PIM data being associated with a second field identifier, the PDA including a display device, the software program being capable of execution by a processor, the software program comprising:
a first program portion which when executed by the processor causes the processor to retrieve (i) a first time stamp generated when the first personal information management data was entered, and (ii) a second time stamp generated when the second PIM data was entered;
a second program portion which when executed by the processor causes the processor to compare the first field identifier and the second field identifier;
a third program portion which when executed by the processor causes the processor to compare the first time stamp and the second time stamp;
a fourth program portion which when executed by the processor causes the processor to select the first PIM data as a primary data field and the second PIM data as a subordinate data field if the first field identifier matches the second field identifier and the first time stamp is later than the second time stamp;
a fifth program portion which when executed by the processor causes the processor to display the primary data field on the display of the PDA; and
a sixth program portion which when executed by the processor causes the processor to display a symbol on the display of the PDA to indicate that the subordinate data field is available.

22. A computer readable medium as defined in claim 20, further comprising:
a seventh program portion which when executed by the processor causes the processor to detect a user input associated with the symbol;
an eighth program portion which when executed by the processor causes the processor to remove the primary data field from the display of the PDA in response to the detection of the user input associated with the symbol; and
a ninth program portion which when executed by the processor causes the processor to display the subordinate data field on the display of the PDA in response to the detection of the user input associated with the symbol.

* * * * *

UNITED STATES PATENT AND TRADEMARK OFFICE
CERTIFICATE OF CORRECTION

PATENT NO. : 6,879,996 B1
DATED : April 12, 2005
INVENTOR(S) : Edward W. Laves

It is certified that error appears in the above-identified patent and that said Letters Patent is hereby corrected as shown below:

Column 8,
Line 48, delete "step swapping" and insert -- step of swapping --.

Signed and Sealed this

Sixteenth Day of August, 2005

JON W. DUDAS
*Director of the United States Patent and Trademark Office*